UNITED STATES PATENT OFFICE.

LUDWIG EPSTEIN, OF BERLIN, GERMANY.

PROCESS OF MANUFACTURING ELECTRODES FOR SECONDARY BATTERIES.

SPECIFICATION forming part of Letters Patent No. 425,999, dated April 22, 1890.

Application filed May 31, 1889. Serial No. 312,787. (No specimens.)

*To all whom it may concern:*

Be it known that I, LUDWIG EPSTEIN, a subject of the Emperor of Austria-Hungary, residing at Berlin, in the Kingdom of Prussia and German Empire, have invented certain new and useful Improvements in the Process for the Manufacture of Electrodes for Electric Accumulators; and I do hereby declare the following to be a full, clear, and exact description of the invention, such as will enable others skilled in the art to which it appertains to make and use the same.

My present invention refers to those electric accumulators in which lead in a suitable porous shape acts as the negative electrode, and peroxide of lead as the positive electrode, and in which there is no coating or pressing of pulverized lead or plumbic oxides or salts of lead on or in suitable bearers, but in which, by means of chemical electric processes, the active part is produced direct on the lead bearer.

The purpose of my present invention is to attain a quick formation of electrodes that combine durability with great action, notwithstanding the quickness with which they are formed. The purpose in view is attained by dividing the process of manufacturing the electrodes into two separate parts, the first part being limited to the making of so-called "raw electrodes," which latter are then transformed into positive electrodes with the assistance of the electric current in an electrolyte containing either diluted sulphuric acid or a suitable compound of sulphuric acid, while the negative electrodes are formed by a reduction of the positive electrodes. In order to obtain the so-called "raw electrodes" that furnish the raw material for the definite electrodes, bodies consisting of lead of any shape whatever and suitable for use as electrodes are put into water rendered acidulated by the addition of a small quantity (about one per cent.) of nitric acid, and then this water is heated up to the boiling-point. The lead bodies immersed in water of this kind are kept from coming in contact with each other by being suspended or in some other way, so that the fluid has access to them all around. The water is always kept up to the boiling-point, and the boiling is continued till the metallic glance that the lead bodies originally had has disappeared and the lead has assumed a dull-gray appearance. The lead bodies thus treated are then taken out of the boiling water and dried in the atmospheric air. On the lead bodies is thereby produced a grayish yellow deposit or layer, which consists of compounds of lead, and which is characterized by the following properties: First, it is fine-grained in structure and has the appearance of mildew; second, it adheres very firmly to the lead bodies; third, it is insoluble in the electrolyte used for the subsequent treatment, the electrolyte being generally composed of diluted sulphuric acid; fourth, it has a great capacity for taking up the gases engendered in the formation of electrodes by means of the electric current, so that it renders possible to form the electrodes quickly without it being necessary to reverse the direction of the electric current. Instead of drying these lead bodies in atmospheric air they can be dried after being boiled in the way just described in such gases (as oxygen and other similar gases) that promote the formation of the deposit or layer just described and characterized. The lead bodies treated in the above-described way are then the so-called "raw electrodes," from which the positive as well as the negative electrodes are formed.

In order to form positive electrodes, a number of raw electrodes forming a group are put into the electrolyte, lead plates being inserted between them, or they are put in together with positive electrodes that have to be transformed into negative electrodes, as will be mentioned hereinafter. The raw electrodes that have to be formed into positive electrodes are then connected with the positive pole of the primary current and the intervening plates with the negative pole of the primary current, by which means the formation of the electrodes by the effect of the electrolyte commences as soon as the current is turned on. In this process of forming positive electrodes the former grayish-yellow color of the raw electrodes changes into a deep dark-brown, almost bluish-black hue, and the process may be considered as completed as soon as the electrodes have assumed that color, and an abundant development of gases (oxygen in this case) takes place on the positive electrodes thus formed.

For the purpose of forming negative electrodes part of the lead bodies converted into positive electrodes by the process just described are used in the place of the lead plates inserted between the electrodes formed into groups, as above mentioned, in the formation of positive electrodes. Instead of placing the positive electrodes which are to be reduced into negative ones between the raw electrodes which are formed into positive electrodes, they may also be placed between lead plates; but it will be easily understood that the latter arrangement is less economical. The oxygen of the peroxide of lead produced on the positive electrodes which are to be reduced is absorbed by the effect of the electric current and the bodies are reduced on their surface to porous metallic lead. The process of forming negative electrodes may be considered as finished when the deep dark-brown or bluish-black color of the positive electrodes used for the purpose has changed into a bluish-gray hue and an abundant development of gases (in this case hydrogen gas) takes place on the negative electrodes thus formed.

The advantage in favor of the method just described is in particular that for forming electrodes of one sort from the raw electrodes prepared in the way described a few hours only are necessary, and the reversing of the electric current used in other processes for this operation is unnecessary, so that in a very short space of time a great number of positive as well as of negative electrodes can be produced. Further advantages are also to be found in the facts that these electrodes last extremely well, and that even in case of numerous charges and discharges there is no crumbling off, no scaling, nor any other deformation of the active parts of these electrodes. They have, besides, a great storing capacity, and, owing to their very great porosity, they allow with very little weight very powerful charging and discharging currents to pass through them, by which qualities there is a great saving in weight, volume, or time, according as one or the other of the latter may be desirable or necessary.

Having thus described my invention, and also the manner how and the means by which the same is to be performed, what I claim, and desire to get secured by Letters Patent of the United States, is—

1. The process of manufacturing electrodes for electric accumulators, which consists in first boiling the lead plates in weak acidulated water, then drying the plates, and finally subjecting them to the action of the primary electric current, substantially as set forth.

2. The process of manufacturing electrodes for electric accumulators, which consists in first boiling the lead plates in weak acidulated water, then drying the plates, then subjecting them to the positive primary electric current, and finally subjecting the positive electrodes thus produced to the negative primary electric current, substantially as set forth.

In testimony whereof I affix my signature in presence of two witnesses.

LUDWIG EPSTEIN.

Witnesses:
 M. M. RATTEN,
 B. ROI.